United States Patent [19]
Davies

[11] Patent Number: 5,329,595
[45] Date of Patent: Jul. 12, 1994

[54] SYSTEM AND METHOD FOR ANALYZING OPTICAL SPECTRAL DATA OF A TERRAIN IMAGE

[75] Inventor: Donald W. Davies, Torrance, Calif.

[73] Assignee: TRW Inc., Redondo Beach, Calif.

[21] Appl. No.: 893,489

[22] Filed: Jun. 5, 1992

[51] Int. Cl.$^5$ ............................ G06K 9/46; G01J 3/28
[52] U.S. Cl. ...................................... 382/17; 356/326; 348/144
[58] Field of Search ...................... 356/326; 382/17, 1; 358/109

[56] References Cited

U.S. PATENT DOCUMENTS

| | | | |
|---|---|---|---|
| 3,829,218 | 8/1974 | Alyanak | 356/300 |
| 4,560,275 | 12/1985 | Goetz | 356/326 |
| 4,660,151 | 4/1987 | Chipman et al. | 356/326 |
| 4,731,663 | 3/1988 | Kovalchick et al. | 382/17 |
| 4,743,112 | 5/1988 | Burke | 356/326 |

*Primary Examiner*—Leo H. Boudreau
*Assistant Examiner*—D. R. Anderson
*Attorney, Agent, or Firm*—Sol L. Goldstein

[57] ABSTRACT

An image processing system and method for performing optical signal processing including target recognition and filtering. The system is particularly useful in remote or mobile imaging processing systems where the data gathering capabilities exceed the ability of the system to transmit this data over conventional data links. The system includes a spectrometer which receives portions of an image and produces a plurality of spectra of individual pixels in the image. A light-sensitive detector receives the spectra and converts the spectra into electrical signals. A memory unit stores a predetermined matrix of coefficients, each coefficient corresponding to one wavelength of said spectral signal. A multiply and accumulate unit received one spectral signal and a corresponding matrix coefficient and adds the products to generate a spectral measure for each pixel in the image. By changing the matrix in the memory unit, it is possible to synthesize a wide variety of desired optical processing functions such as target recognition, correlation and filtering.

27 Claims, 4 Drawing Sheets

SYSTEM AND METHOD FOR ANALYZING OPTICAL SPECTRAL DATA OF A TERRAIN IMAGE

BACKGROUND OF THE INVENTION

1. Technical Field

The present invention relates to optical signal processors, and more particularly to a programmable system and method for analyzing optical spectral data from an image.

2. Discussion

Image gathering systems are capable of sensing and storing high-quality images of objects with extremely high resolution. When such systems are located at remote locations (particularly in mobile systems), the data gathered thereby must often be transmitted to a base receiver. However, often the data gathering capabilities of the imaging system usually exceeds its ability to transfer this data over conventional data links. Because of this, serious compromises must be made in deciding what data to transmit and what to discard.

This is a serious limitation in many areas such as earth monitoring satellites (eg. LANDSAT) which are capable of acquiring much more data than they can feasibly transmit to the ground. To deal with this problem, imaging instruments in the satellite typically will send down the spectral intensity of an image integrated over a small number of bands of wavelength in order to ease the burden on the downlink. For example, the imaging instrument may integrate over a region of the spectrum and transmit a single number that indicates the average radiance over that region. The entire spectrum may be reduced to five data points representing the radiance in five wavelength bands. This results in a serious loss of information present at wavelengths not included in the bands selected, as well as loss of information other than the average intensity of the spectral signature inside the bands. This degraded information may then be transmitted to the ground and used to identify areas in the scene by their spectral signatures. Of course, this identification is limited by the incompleteness of the information.

Moreover, the particular wavelength bands chosen must be fixed on the ground before the satellite is launched and cannot be changed thereafter. As a result, the wavelength bands chosen often represent a compromise between the competing demands and desires of a number of groups desiring to use the spectral information. For example, these groups may include oceanographers, arctic ice mappers, mineralogical exploration teams, groups performing agricultural mapping, and organizations mapping oil spills. Each of these groups would like to have the data transmitted in spectral bands tailored to their particular applications. The bands actually chosen generally represent a compromise which is not ideal for any of these applications. Since the small number of spectral bands (which typically may be six) are incorporated into the system by means of physical optical filters, they cannot be changed after the satellite is deployed and the users must simply make the best of the compromise bands.

Thus, it would be desirable to provide an image processing system which permits changes to be made in the spectral analysis of an image without altering the physical hardware. Also, it would be desirable to provide such a system in which the nature of the optical spectral analysis is programmable, so that it can be altered from a remote location.

In addition, it would be desirable to provide an image processing system which permits the utilization of all available information to perform target recognition. Further, it would be desirable to provide such a system which can significantly compress the gathered image data without sacrificing useful information when performing target recognition. Also, it would be desirable to provide a system with the above features which is relatively light, inexpensive and suitable for use in systems such as satellites.

SUMMARY OF THE INVENTION

Pursuant to the present invention, an image processing system is provided which performs flexible, programmable analysis of spectral data. As a result, the nature of this analysis can be readily altered even from remote locations. In accordance with a first aspect of the present invention, the system includes a spectrometer for receiving portions of an image and producing a plurality of spectra of individual pixels in the image. A light sensitive detector receives the spectra and converts it into electrical data signals. In general, there will be N signals each corresponding to N wavelengths for each pixel. An analog to digital converter converts the electrical spectral data signals from the light sensitive detector into digitized spectral data signals. A memory unit coupled to the analog to digital convertor is provided for storing a predetermined matrix of coefficients, each of the coefficients in the matrix corresponding to one of the N frequency values. The memory units has an output transmitting one coefficient each time it receives one of the digitized spectral signals from the analog to digital converter. A multiply and accumulate unit receives input from both the memory and from the analog to digital converter and multiplies the digitized spectral data signals by a corresponding coefficient in the matrix received from the memory unit. The multiply and accumulate unit also adds the multiplicative products to generate a spectral measure for each pixel in the image. By changing the matrix of coefficients in the memory means, it is possible to synthesize a wide variety of desired optical processing techniques such as correlation and filtering.

In accordance with a second aspect of the present invention, the matrix of coefficients stored in the memory means is selected to provide non-zero values in certain bands of corresponding frequencies and zero values in others. In this way, a plurality of spectral frequency bands can be analyzed by the system and also can be readily changed by altering the matrix stored in the memory unit.

Pursuant to another aspect of the present invention, an image processing system is provided which analyzes image data before it is transmitted. In this way, all of the image data is used to generate a correlation image. This correlation image represents a correlation between the spectrum of the received image and known target features. In more detail, this system includes a spectrometer for receiving portions of the image and for producing a plurality of spectra of individual pixels in the image. A light sensitive detector receives the spectra and converts the spectra into electrical data signals. A target recognition unit processes the spectra data and includes a correlation means for comparing the spectra data with previously stored spectra data from known classes of features. This correlation represents a measure of the similarity between the spectra for the received pixels and the spectra for the known feature. In this way the correlation measure indicates the likelihood that each pixel belongs to each of the feature classes. A correlation image may then be generated from this measurement which will indicate where expected features are located in the image.

In accordance with still another aspect of the present invention, a method is provided for processing image data for transmission from a remote unit such as a vehicle to a receiving unit. The method includes the steps of receiving a plurality of pixels of an image in a spectrometer and generating a spectra for each of the pixels. The spectra data from known classes of features is stored in the system. A correlation measure is generated which comprises a measure of the similarity between the spectra for the received pixels and the stored spectra for the known features. The correlation measure indicates the likelihood that each pixel belongs to each of the feature classes. This correlation measurement data is then transmitted from the remote unit to a receiving unit. In this way, all of the available information is used to perform target recognition. This operation is easily implemented in hardware. Yet, the down-link data rate is comparable to that used in prior systems which only transmit a fixed number of spectral bands. As a result, all of the information in the entire spectrum is used and is not lost in the discrimination process.

DESCRIPTION OF THE PREFERRED EMBODIMENTS

The present invention provides systems and techniques for analyzing optical spectral data. These techniques permit this analysis to be readily altered by merely changing a coefficient matrix stored in memory. In a first preferred embodiment, shown in FIGS. 1-4, the present invention is adapted to perform real-time pattern recognition. In this system patterns to be recognized are defined by numbers in a coefficient matrix. In a second preferred embodiment, the present invention is adapted to provide an integrated spectral measure over one or more selected frequency bands. In the second embodiment, the frequency bands are defined by the coefficient matrix. Since the coefficient matrix can be readily altered (even remotely through a communication channel) the present invention provides an extremely flexible optical processing system. For example, by altering the coefficient matrix through a communications channel, a single system may be used to practice both the first or the second embodiments. In addition, other kinds of optical analysis may be performed by the system of the present invention by appropriate modification of the coefficient matrix.

Figure 1:
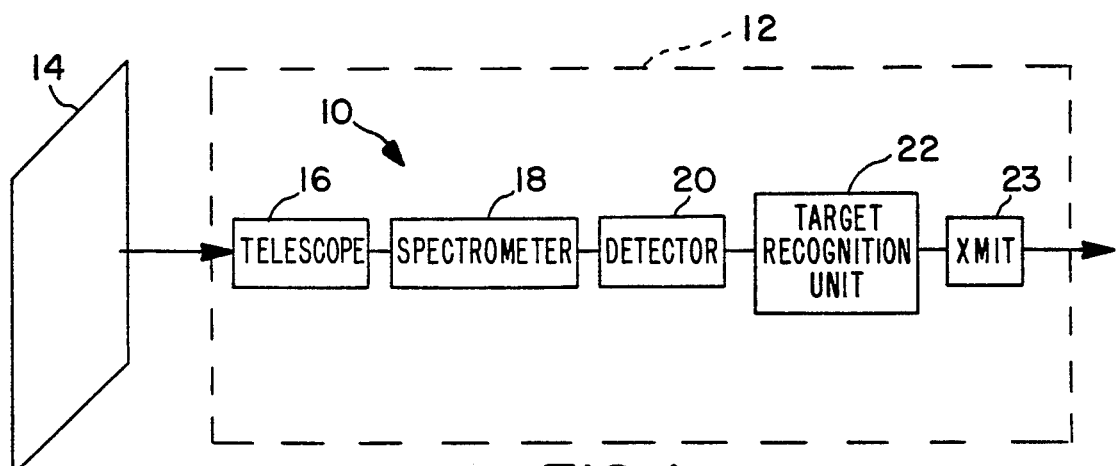
FIG. 1 is a diagram of the automatic target recognition system in accordance with a first embodiment of the present invention.

Referring now to FIG. 1, a diagram of an automatic target recognition system 10 in accordance with a first preferred embodiment of the present invention is shown. The target recognition system 10 in the preferred embodiment is mounted in an earth monitoring satellite 12. It will be appreciated that the system and techniques of the present invention can be applied in many other contexts where the system's image gathering capabilities exceed its ability to transmit or download the image data. Also, the present invention has applications in systems where recognition must be done in real time. These may include imaging systems mounted in aircraft and other vehicles, for example. Light from a scene 14 is received by a telescope 16 which focuses the scene on to a slit of a spectrometer 18. In the preferred embodiment, spectrometer 18 is a dispersive focusing spectrometer which includes an entrance slit for receiving light and which disperses every point along the slit into a spectrum onto an exit plane of the spectrometer 18. This results in a two-dimensional intensity distribution. This intensity as a function of slit position and wavelength is received by a two-dimensional focal plane array 20. It should be noted that other kinds of detectors may be used although the two-dimensional focal plane array is preferred in this embodiment.

The output of the focal plane array 20 is a serial data stream wherein the entire spectra of the top point of the slit is transmitted before any information on the next point of the slit. This serial data stream which, for example, may consist of 128 individual intensity measurements at different wavelengths, is input to a target recognition unit 22. The scene 14 is scanned (by a scanning device (not shown) or by movement of the entire target recognition system 10) until all of the scene 14 has been focused on the spectrometer 18 entrance slit.

The target recognition unit 22 performs a comparison of the spectra of individual scene picture elements (pixels) to a set of m predefined basis spectra chosen to be representative of materials expected in the scene, or alternatively chosen from specific areas of the scene itself. The output of the target recognition unit 22 will comprise "images" whose brightnesses are proportional to the amount of each of the basis vectors contained in each scene element. In the preferred embodiment the target recognition unit 22 produces a least-square fit of the spectra of the individual pixels to a sum of m predefined basis spectra. Of course, other techniques of performing the correlation may be employed such as spectral band difference and ratios. The data from the target recognition unit 22 is then transmitted by a transmitter 23 to a ground-based receiver (not shown).

Figure 2:
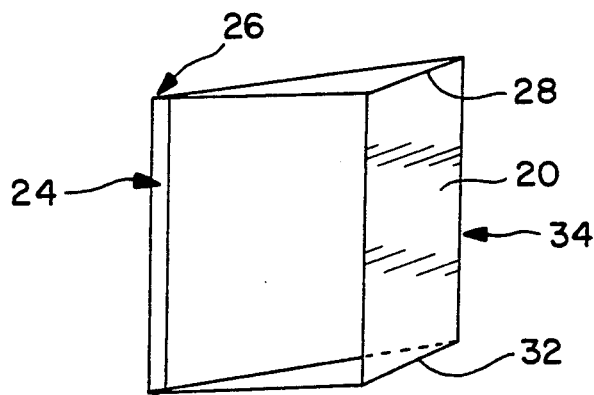
FIG. 2 is a diagram of the spectrometer and focal plane array of the automatic target recognition system of the present invention shown in FIG. 1.

Referring to FIG. 2, further details of the spectrometer 18 are shown. The spectrometer entrance slit 24 receives a portion of an image of the scene 14 which has been focused by the telescope 16 on to the entrance slit 24. As shown in FIG. 2 the entrance slit 24 is oriented vertically. In the preferred embodiment, the slit will encompass an area of the image which is, for example, one pixel wide and 240 pixels from top to bottom. The spectrometer 18 disperses every point along the slit 24 into a spectrum horizontally. For example, the light at a top-most point 26 of the slit 24 will be dispersed along a horizontal line 28 with the short wavelength region of the spectrum to the left and the long wavelength region to the right along line 28. Likewise, light entering the slit at point 30 will be dispersed along a horizontal spectra line 32. Between lines 28 and 32 will be the spectra for the other 240 pixels in slit 24. The horizontal spectra such as lines 28-32 exist along the exit plane 34 of the spectrometer 18.

As discussed above, the two-dimensional focal plane array 20 is disposed along this exit plane 34 to receive and measure the intensity of light at each point on its surface. In the preferred embodiment, focal plane array has at least 128 sensors along the length of lines 28 and 32 to produce 128 individual intensity measurements along each line. In addition, focal plane array 20 has at least 240 horizontal rows of light sensing elements along its vertical height. Focal plane array 20 produces a serial data stream which begins with the top spectra 28 proceeding from left to right and then proceeding to the next one of the 240 horizontal rows downward. It should be noted that for the focal plane array 20 to perform in this manner it must be oriented correctly. If it were instead rotated by 90 degrees the data stream would begin with the values for the first wavelength band for all of the points along slit 24.

Figure 3:
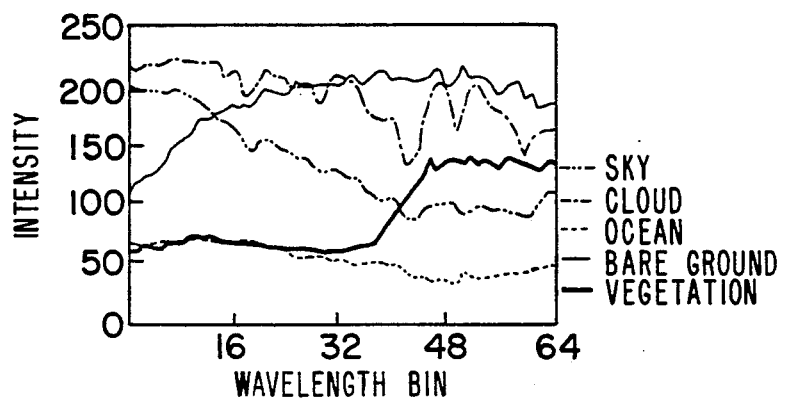
FIG. 3 is a diagram of five basis vector curves used in accordance with the present invention.

The process of doing a linear least-squares fit of the data to a series of basis vectors involves multiplying each spectra in the scene by a matrix. This will be called the "discrimination matrix". In the preferred embodiment, the discrimination matrix is calculated using a standard well-known technique called "Singular Value Decomposition"; other mathematical techniques can also be used. The target basis vectors are used to calculate the discrimination matrix; this matrix is then stored in the target recognition unit 22 before the serial data stream is transmitted from the focal plane array 20 to the target recognition unit 22. Referring now to FIG. 3, examples of five target basis vectors are shown. FIG. 3 shows a set of five graphs corresponding to sky, cloud, ocean, bare ground and vegetation as indicated. Intensity is plotted as a function of wavelength. The particular basis vectors used will depend on the particular application and may be chosen to be representative of materials expected in the scene, chosen from specific areas of the scene, or artificially generated to enhance discrimination. In any event, it is desirable to match the idiosyncracies of the instruments used to determine the spectra for each basis vector as shown in FIG. 3 with the actual instruments of the system of the present invention 10. If the same instrument can't be used, effects such as inefficiencies in the instruments actually used can be accounted for by simply correcting the data.

Once the desired discrimination matrix is stored in the target recognition unit 22 it can begin to receive data from the focal plane array 20. Data from the first point 26 in entrance slit 24 which comprises the spectra along line 28 will create a curve which will be compared by the target recognition unit 22 to one row of the discrimination matrix in FIG. 3. Thus, if the pixel at point 26 is a portion of the scene which comprises vegetation, it will likely match the vegetation row. As discussed above, a number of mathematical techniques are available to determine such a correlation. In the preferred embodiment, the target recognition unit 20 produces a least-square fit of the two curves.

Figure 7:
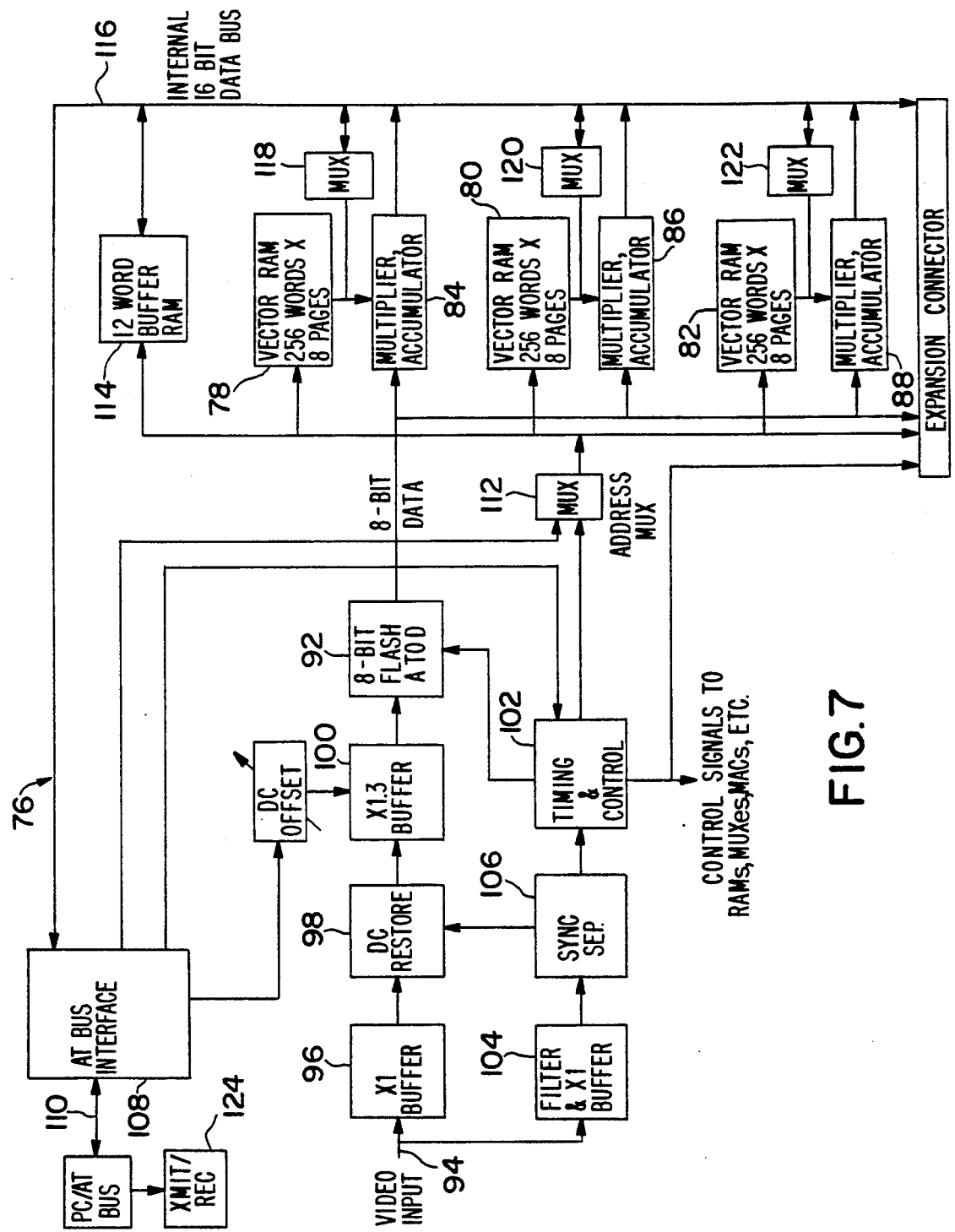
FIG. 7 is a hardware block diagram of a preferred processor which may be used to implement either the first or second embodiments of the present invention.

In more detail, for each of the items being discriminated, each of the 128 elements of the spectra (columns) are multiplied by an element from the same column of the discrimination matrix. (Different items have different rows). The matrix is calculated as described above. The sum is then taken of all of the coefficients multiplied by the corresponding data element. If there is essentially no match between the spectrum coming out of the focal plane array 20 and a particular basis vector being analyzed then the sum will come out to be approximately zero since some of the coefficients will be positive and some will be negative. If there is a good match, the sum will come out to be close to one, after proper normalization. The resulting sum is a correlation value which indicates the likelihood that the pixel producing the spectra is from a given basis vector, e.g. sky, cloud, ocean, bare ground, or vegetation. A preferred embodiment of a hardware system for performing the calculation of these correlation values is discussed below in connection with FIG. 7. It will be appreciated that all of the functions of the target recognition unit may be performed by a wide variety of embodiments employing various degrees of hardware versus software. The embodiment shown in FIG. 7 is but one of these possibilities. In any event, m correlation values are determined for each pixel in the image, where m is the number of basis vectors. By causing the telescope 16 to scan the entire image over the entrance slit 26 using well-known scanning techniques, data is gathered for every pixel in the image.

Figure 4A:
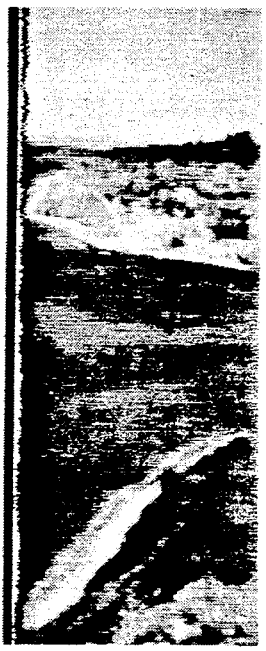
FIGS. 4A-4F depict a reference image and five discrimination pictures for five target features produced in accordance with the present invention.
Figure 4B:
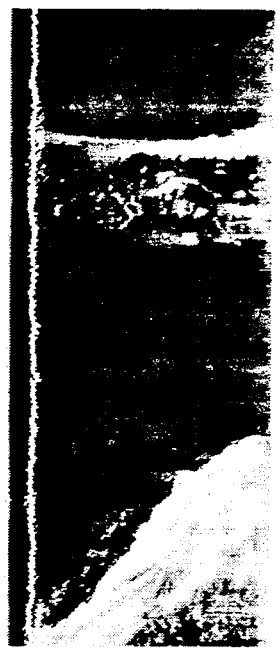
Figure 4C:
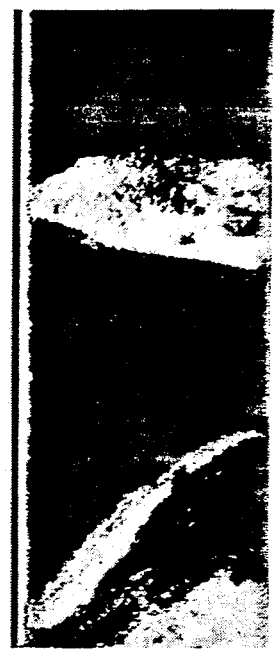
Figure 4D:
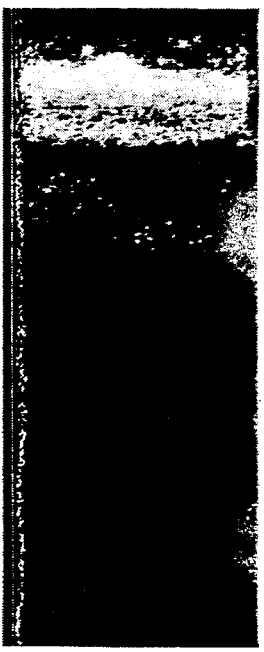
Figure 4E:
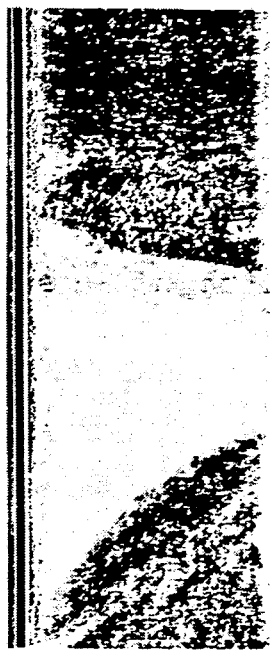
Figure 4F:
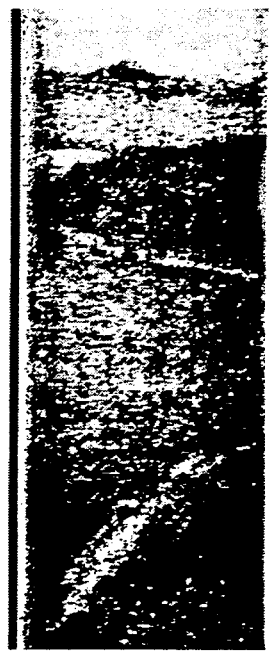

Referring now to FIGS. 4A-4F, the results of this process are shown. FIG. 4A indicates a reference image of a terrestrial scene which may comprise, for example, 600 by 240 pixels which represents, for example, a 600 pixel sweep of slit 24. For each pixel of the reference picture depicted in FIG. 4A, five correlation values are determined in the above-described manner for each of the five basis vectors. In FIG. 4B, for example, the lower right of the picture is bright, and the central and upper portion is dark. This represents the correlation with the vegetation spectra shown in FIG. 3 with each pixel in the reference picture, FIG. 4A. Not surprisingly, high values (1 or close to 1) are found in the areas of ground, while low areas of correlation are shown as black, which correspond to the sky and water in the reference picture. Likewise, FIG. 4D shows high values where clouds exist in the reference picture. The above process can easily be accomplished in real-time on-board the satellite 12 because the calculation of the images is reduced to an operation that involves only m multiplications and adds for each spectral element. (m=5 in our example) These computations could easily be implemented in hardware.

The data which produced FIGS. 4A-4F may then be transmitted from the target recognition unit 22 out of the satellite 12 to a ground-based receiver. The downlink data rate for m discriminate pictures is no larger than that typically used for m spectral bands, as used in prior earth monitoring satellites. In contrast, however, in the present invention all of the information in the entire spectrum (for example, 128 individual measurements for each pixel) has gone into the discrimination process. For example, in the referenced picture in FIG. 4A, 128 individual measurements were made for each of the 144,000 pixels, which represents 18.4 million measurements. All of these measurements were utilized in arriving at the resultant correlation images of FIGS. 4B-4F. Yet, only $6 \times 144,000 = 864,000$ data points must be down-loaded. In prior systems where, for example, 6 spectral bands were down-loaded, the same number of data elements are transmitted but much less information is contained therein due to the above-described disadvantage of only utilizing selected spectral bins and discarding the remaining data.

Thus, with some a priori knowledge of what targets are sought after (in the form of the basis vectors), the present invention permits an analysis to be done on board the satellite utilizing all of the information. In prior systems, such analysis would typically be performed on the ground, albeit with access to less information. It will be appreciated that the present invention may be applied to visible or other ranges in the electromagnetic spectrum. Also, in addition to earth monitoring satellites, the present invention may be employed in various kinds of vehicles. For example, a wide variety of types of targets may be employed to generate basis vectors. For example, with very specific knowledge of the spectra of the individual target, (such as paint on a vehicle) the present invention can indicate with great clarity and little noise exactly where in a correlation image that vehicle appears, thus identifying the target vehicle.

Figure 5:
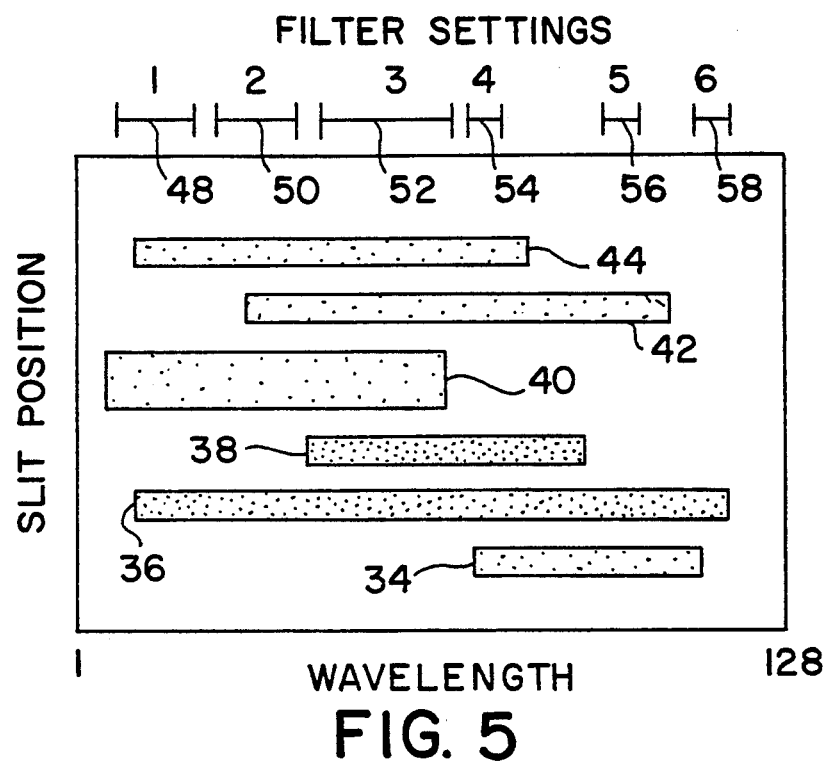
FIG. 5 is a diagram of a typical spectrometer output as processed by a second embodiment of the present invention.
Figure 6:
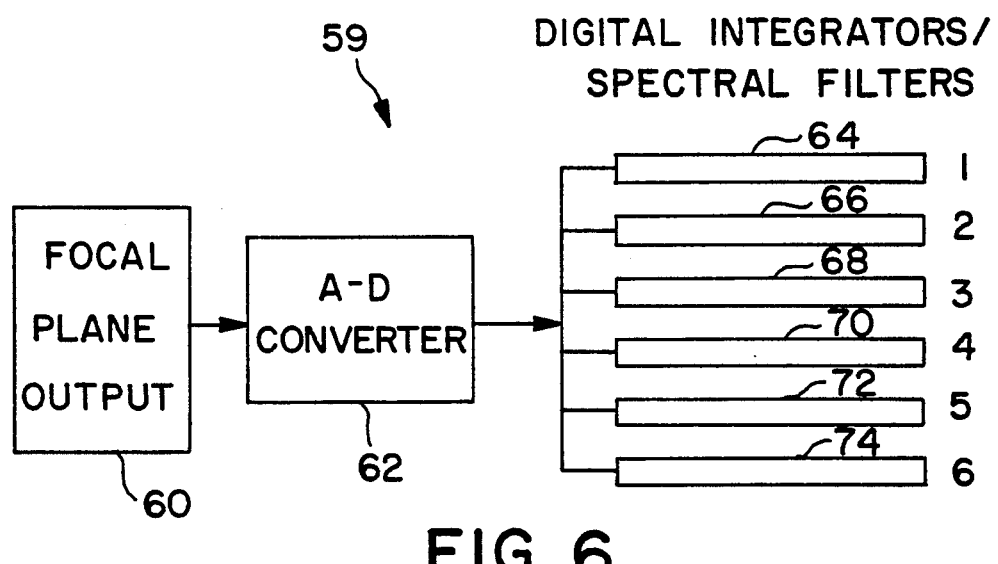
FIG. 6 is a block diagram of the main components of the second embodiment of the present invention.

Referring now to FIGS. 5 and 6, a second preferred embodiment of the present invention is shown. FIG. 5 shows a representative diagram of a spectrometer output. The spectrometer may be the same spectrometer 18 as shown in FIG. 1. The spectrometer output is shown with wavelength plotted on the horizontal axis and vertical position along the spectrometer entrance slit plotted on the vertical axis. From this diagram, it is evident that six distinct objects are being viewed through the slit. Assuming that the shorter wavelengths are to the left and longer wavelengths to the right, it can be seen that the bottom-most object which produces a spectrum 34 is a reddish object. The next object above, which produces spectrum 36, is white or gray. Object producing spectrum 38 is somewhat greenish in color; while the fourth object produces a spectrum 40 which indicates that it is somewhat bluish in color. Also, it can be seen that the object producing spectrum 40 is thicker than objects producing spectrums 42 and 46 since it occupies a larger portion of the scene viewed through the slit. The six spectrums 34–46 are shaded differently to indicate the differing brightness of each object.

As discussed previously, due to the limited downlink data transmission capacity in many systems such as satellites, it is desired to select only discrete frequency bands of the spectrometer output for transmission to the ground. For example, it may be desired that these bands occupy the frequency range defined by filters labeled 1–6 (defined by ranges 48, 50, 52, 54, 56 and 58). In previous systems such as the LANDSAT satellite system, these frequency ranges were fixed before launching the satellite and could not be altered later on. This is because the frequency bands were typically selected by hardware consisting of optical filters. In accordance with the present invention, the filter settings are made in a flexible matter which permits their modification by merely sending appropriate commands to the satellite.

In more detail, referring to FIG. 6, the output of a spectrometer producing individual spectrums such as those shown in FIG. 5 is received by a detector such as a focal plane array 60 which is similar to the detector 20 shown in FIG. 1. This output is then fed to an analog to digital converter 62 where it is converted into digital signals which are transmitted simultaneously to six individual filters 64, 66, 68, 70, 72 and 74. These filters synthesize the effect of optical filters by effectively sampling the A to D converter 62 output only during the time when signals from a particular band of spectral wavelengths are being transmitted from the focal plane array 60. For example, the first filter 64 will be "on" only during the time that the focal plane array 60 is transmitting signals from wavelength band 48 in FIG. 5.

In operation, focal plane array 60 will first transmit signals resulting from the upper most element in the entrance slit of the spectrometer. That is, light from this element produces a spectrometer output consisting of light signals on the local plane array 60 falling within the range between the minimum to maximum wavelength scale shown in the diagram in FIG. 5. The focal plane array output will commence with the left-most wavelength signals in this spectrum and proceed toward the longer wavelengths. This signal is fed simultaneously to each of the digital integrators 64–74.

Initially, the first filter 64 will be "on" while it accepts wavelengths in the filter range 48 shown in FIG. 5. Then filter one 64 will shut off and no filter will process input for a time until filter two 66 is on interval two 50 in FIG. 5. Thus, only filter two 66 will be integrating the output during the time that signals of that wavelength band are being received. This process continues until the focal plane array 60 has reached the longest wavelength. At that time, after filters one through six have completed their integration, these filters will then transmit an output which represents the total integrated light intensity in that filter band for that element in the slit.

Next, the focal plane array will begin to output the signal received from the next lower picture element in the slit and this output will be processed sequentially by filters one through six in a similar fashion. Generally it is useful to produce the total integrated light signal in each filter band. This may be accomplished, for example, by having each filter multiply the input by one during the time in which an input is received corresponding to the wavelength band for a given filter and then the input may be multiplied by zero during the other period. The total output is then summed and transmitted as an output for each pixel. Alternatively, it may be desired to have a filter which matches a specific transmission curve. Thus, instead of having the input multiplied by ones during the "on" period, the filters 64–74 may instead multiply their inputs by values other than one. Negative numbers may also be used.

It will be appreciated that a number of hardware and software techniques may be used to implement the tunable filter 59 shown in FIG. 6. For example, filters 64–74 may comprise separate multiply and accumulate chips receiving their input from memory having stored a coefficient matrix containing the appropriate multipliers for each corresponding filter interval 48–58. Alternatively, a timing approach may be used which turns each filter on only during specified times.

A specific preferred embodiment of the present invention is shown in FIG. 7. This optical processor 76 in FIG. 7 may be utilized to implement either the tunable filter 59 shown in FIG. 5 or the pattern recognition unit 22 in FIG. 1. That is, which one of these two processes processor 76 implements is determined entirely by the programming. Specifically, the matrix of coefficients multiplied by the inputs determines which function is performed. In the processor 76 in FIG. 7, this matrix is stored in a series of random access memory (RAM) units 78, 80 and 82. Each of these RAM units 78–82 provide input to one multiplier and accumulator units 84, 86 and 88. The other input to the multiplier and accumulator units 84–88 is received along data input line 90 which receives 8-bit data from an A to D converter 92. The A to D converter 92 receives spectrometer data from a focal plane array in the form of video input 94 which it passes through a buffer 96 for electrical isolation, a dc restoration unit 98, and a second buffer unit 100 for signal gain and summing the offset value. The A to D 92 also receives timing and control signals from a timing and control module 102 which receives input from a synch-separator unit 106 which extracts composite and vertical synch. The synch separator 106 receives input from the video input through filter and buffer 104 which prevents the synch separator from loading the filter. The filter reduces the noise. The synch-sep. unit 106 also has an output to the dc restore unit 98 which causes DC restore unit to use the back porch of horizontal synch for the DC reference. The timing and control unit 102 also receives input control signals from a host computer through a PC-AT bus interface unit 108 connected to a host computer (not shown) along bus 120. The timing and control unit 102 also controls a multiplexer unit 112 which controls the origin of the addresses of the RAMS (either internally generated by the timing and control unit 102 or by the host computer). A 12-word buffer RAM 114 is used to store the accumulated result from each multiplier and accumulator. The 12-word buffer RAM unit 114 output is transmitted to an internal 16-bit data bus 116 which is also connected to the A-T bus interface 108. Each multiplier and accumulator also receives control signals from timing and control unit 102. The multiplex units are used to isolate the data path between each vector RAM and its associated multiplier accumulator from the internal data bus during video processing.

In operation, a video signal from a focal plane array 60 is received along 94 and is transmitted through the optical processor 76, controlled by the above-described circuits, and reaches each of the multiplier accumulator units simultaneously. At the same time, each RAM 78–82 programmed transmits, in accordance with the desired processing function, a value from its internal coefficient matrix that corresponds to that particular input from the focal plane array. That is, the RAMS are triggered by the timing and control unit 102 to output the value in the matrix that corresponds to that particular spectral wavelength of the signal being transmitted. For example, when the optical processor 76 is used for target recognition, each RAM will multiply the input signal by the appropriate coefficient derived from the basis vector to produce the desired correlation value for that input. Alternatively, where the optical processor 76 is implementing the tunable filter 59, the memory unit matrix will cause the appropriate multiplier to be input to the multiplier and accumulator 84 which will produce the integrated output for the desired filter intervals as described in connection with FIGS. 5 and 6.

In any case, multiplier and accumulators 84, 86, and 88 will multiply the two inputs and add the products from successive multiplications until an entire spectra for a pixel is processed. This result will then be output to the 16-bit data bus 116 where it may be displayed or transmitted as desired. For example, an A-T bus interface 108 may be connected to a transmitter receiver unit 124 which may then transmit the results to a remote location. For example, where optical processor 76 is used in a satellite transmitter 124 may transmit this information to a receiver on the ground. Likewise, transmitter receiver 124 may also receive control signals from the ground and these signals may be used in by the host computer to send appropriate signals to the memory units 78, 80, and 82 to change the coefficient matrix inside each memory. For example, this may be used to change the filter settings in the tunable filter 59 or may be used to change to a target recognition function as shown in FIGS. 1-4.

From the foregoing, it can be seen that the present invention provides an optical processor in which the functions can be altered simply by changing coefficients in memory. It can perform target recognition or filtering and its functions can be altered remotely through data transmission. Those skilled in the art can appreciate that other advantages can be obtained from the use of this invention and that modification may be made without departing from the true spirit of the invention after studying the specification, drawings and following claims.

What is claimed:

1. A system for processing optical data, said system comprising:

spectrometer means for receiving portions of an image and producing a spectra for each individual pixel in said image;

light detector means for receiving said spectra and converting it into transmitted electrical spectral data signals, there being at least N signals for each pixel, each signal corresponding to a wavelength in said spectra;

analog to digital converter means for converting said electrical spectral data signals from said light detector means into transmitted digitized spectral signals;

memory means coupled to said analog to digital converter means for storing a predetermined matrix of coefficients, each of said coefficients in said matrix corresponding to one of said N signals corresponding to wavelength values for one of a plurality of spectral basis vectors, said memory means having an output transmitting one of said corresponding coefficients each time said analog to digital converter means transmits one of said digitized spectral signals; and multiply and accumulate means receiving inputs from both said memory means and said analog to digital converter means for multiplying said spectral data signals by a corresponding coefficient in said matrix, and for adding the resulting multiplicative products to generate a spectral measure for each pixel in said image wherein the coefficients in the matrix are chosen such that the results of multiplication yield both positive and negative values and the sum will be approximately zero where there is no match and will be approximately one where there is a match wherein each of a plurality of resulting sums for each pixel is a correlation value which indicates the likelihood that the spectra for the pixel is from one of the spectral basis vectors.

2. The system of claim 1 further comprising a plurality of memory means, each stored with a different matrix, and a plurality of associated multiply and accumulate means for producing a plurality of spectral measures for each of said pixels.

3. The system of claim 1 wherein said matrix is a correlation matrix containing N coefficient values after each said value is multiplied by one of said N spectral signals in said multiply and accumulate means and wherein the resulting spectral measure is a correlation measure of the similarity of the spectra for a given pixel to a characteristic spectral basis vector for a predetermined image.

4. The system of claim 3 further comprising means for producing an image from the correlation measures for each pixel, said image having pixel intensity values which are proportional to said correlation values.

5. The system of claim 3 further comprising a plurality of said memory means and a plurality of associated multiply and accumulate means for producing a plurality of spectral measures for each pixel and wherein each of said memory means contains a different said correlation matrix and each multiply and accumulate means produces a sum which is a correlation measure of the similarity of the spectra for said pixel to one characteristic spectral basis vector from one of a plurality of predetermined images.

6. The system of claim 3 wherein said correlation matrix values are multiplied by said spectral signals, the resulting correlation measure for each pixel is a least squares fit of said spectra with said basis vector.

7. The system of claim 1 wherein said matrix contains non-zero values in locations corresponding to at least one band of said N frequencies and also contains zeros for other frequency bands, whereby said spectral measure for a pixel is proportional to the sum of the spectral data signals in said band for a given pixel.

8. The system of claim 7 wherein said matrix values in said one frequency band are ones and in other frequencies are zeros.

9. The system of claim 7 further comprising additional memory means and associated multiply and accumulate means, each memory means and multiply and accumulate means simultaneously receiving the same spectral data signals, and each memory means stored with matrix values which contain non-zero values for different frequency bands, whereby a plurality of spectral measures are produced, each being proportional to the total spectral data within one of said frequency bands.

10. A system for analyzing data from an image, said system comprising:
   spectrometer for receiving portions of said image and producing a plurality of spectra of individual pixels in said image;
   light sensitive detector for receiving said plurality of spectra and converting said spectra into electrical data signals; and
   target recognition unit for processing said electrical data signals representing said spectra, said target recognition unit including correlation means for comparing said signals with previously stored spectra data from features of known classes, said correlation means generating a correlation measure of the similarity between said spectra for said pixels and said spectra for said known feature, said correlation means including means for storing a matrix of coefficients, each of said coefficients in said matrix corresponding to one of the wavelength values in said spectra for one of a plurality of spectral basis vectors corresponding to known feature classes;
   said correlation means further including multiply and accumulate means for receiving said coefficients, from said means for storing as well as said electrical data signals, said multiply and accumulate means multiplying said spectral data signals by a corresponding coefficient in the matrix, and the multiply and accumulate means adding the resulting multiplicative products to generate a spectral measure for each pixel in a image, wherein the coefficients in the matrix are chosen such that the results of the multiplication yield both positive and negative values and the sum will be approximately zero where there is no match and will be approximately one where there is a match and wherein a plurality of resulting sums for each pixel is a correlation value which indicates the likelihood that the spectra for the pixel is from one of the spectral basis vectors.

11. The system of claim 10 further comprising means for transmitting said correlation measure.

12. The system of claim 10 further comprising means for producing an image from said correlation measure, said image having pixel intensity values which are proportional to said correlation values.

13. The system of claim 10 further comprising a telescope for receiving said image and transferring said image to said spectrometer.

14. The system of claim 11 wherein said system is adapted to be carried by a vehicle.

15. The system of claim 10 wherein said spectrometer is a dispersive focusing spectrometer.

16. The system of claim 10 wherein said light sensitive detector is a focal plane array.

17. The system of claim 10 wherein said previously stored spectra data comprises a basis vector of said known features, said basis vector including intensity versus wavelength data for said known features.

18. The system of claim 17 wherein said correlation means performs a least-square fit of said spectra with said basis vector curve.

19. The system of claim 11 wherein said means for transmitting said correlation measure transmits a serial data stream of said correlation measure for each pixel.

20. The system of claim 10 wherein said image is a terrestrial image gathered from an airborne source.

21. The system of claim 20 wherein said known features include expected features in said terrestrial image.

22. A mobile image gathering system for transmitting data from an image to a receiving unit, said system comprising:
   a spectrometer for receiving portions of said image and producing a plurality of spectra of individual pixels in said image;
   a light sensitive detector for receiving said plurality of spectra and for converting said spectra into the electrical data signals;
   a target recognition unit for processing said electrical data signals representing said spectra, said target recognition unit including correlation means for comparing said signals with previously stored spectra data from known classes of features, said correlation means generating a correlation measure of the similarity between said spectra for said pixels and said spectra for said known features, said correlation means including means for storing a matrix of coefficients, each of said coefficients in said matrix corresponding to one of the wavelength values in said spectra for one of a plurality of spectral basis vectors corresponding to known feature classes;
   said correlation means further including multiply and accumulate means for receiving said coefficients, from said means for storing as well as said electrical data signals, said multiply and accumulate means multiplying said spectral data signals by a corresponding coefficient in the matrix, the multiply and accumulate means adding the resulting multiplicative products to generate a spectral measure for each pixel in a image, wherein the coefficients in the matrix are chosen such that the results of the multiplication yield both positive and negative values and the sum will be approximately zero where there is no match and will be approximately one where there is a match and wherein a plurality of resulting sums for each pixel is a correlation value which indicates the likelihood that the spectra for the pixel is from one of the spectral basis vectors; and means for transmitting said correlation measure to said receiving unit, wherein said correlation measure is transferred to said receiving unit.

23. The system of claim 22 further comprising means for producing an image from said correlation measure, said image having pixel intensity values which are proportional to said correlation values.

24. A method for processing image data for transmission from a vehicle to a receiving unit, said method comprising:

receiving a plurality of pixels of an image in a spectrometer;

generating a spectra for each said pixel;

converting said spectra into electrical data signals;

comparing said spectra data with previously stored spectra data from known classes of features; by storing a matrix of coefficients, each of said coefficients in said matrix corresponding to one of the wavelength values in the spectra for one of a plurality of spectral basis vectors corresponding to known feature classes, multiplying the spectral data signals by a corresponding coefficient in the matrix, and adding the resulting multiplicative products to generate a spectral measure for each pixel in an image, wherein the coefficients in the matrix are chosen such that the results of multiplication yield both negative and positive values and the sum will be approximately zero where there is no match and will be approximately one where there is a match;

generating a correlation measure for said pixels from said spectral measure which indicates the likelihood that the spectra for the pixel is from one of the spectral basis vectors; and transmitting said correlation measure for each pixel from said vehicle to said receiving unit.

25. The method of claim 24 further comprising the step of generating an image wherein each pixel in said image comprises said correlation measure.

26. The method of claim 24 further comprising the step of repeating said step of generating a correlation for each pixel in said image.

27. The method of claim 24 wherein said step of generating a correlation measure includes the step of performing a least-square fit of the spectra of said pixel with the spectra of known features.

* * * * *